US007602330B2

(12) United States Patent
Serban et al.

(10) Patent No.: US 7,602,330 B2
(45) Date of Patent: Oct. 13, 2009

(54) HORN ANTENNA WITH A COMPOSITE EMITTER FOR A RADAR-BASED LEVEL MEASUREMENT SYSTEM

(75) Inventors: Gabriel Serban, North York (CA); Baljinder Singh, Peterborough (CA)

(73) Assignee: Siemens Milltronics Process Instruments, Inc., Singapore (SG)

( * ) Notice: Subject to any disclaimer, the term of this patent is extended or adjusted under 35 U.S.C. 154(b) by 191 days.

(21) Appl. No.: 11/453,351

(22) Filed: Jun. 13, 2006

(65) Prior Publication Data

US 2007/0008212 A1 Jan. 11, 2007

(30) Foreign Application Priority Data

Jun. 13, 2005 (EP) ................................ 05012669

(51) Int. Cl.
*G01S 13/08* (2006.01)

(52) U.S. Cl. ...................................... 342/124; 324/644

(58) Field of Classification Search ................ 342/124; 324/644

See application file for complete search history.

(56) References Cited

U.S. PATENT DOCUMENTS 3,611,392 A 10/1971 Knox
5,305,237 A * 4/1994 Dalrymple et al. ............ 702/55
5,872,494 A * 2/1999 Palan et al. ................. 333/252
5,877,663 A * 3/1999 Palan et al. ................. 333/252
5,926,080 A * 7/1999 Palan et al. ................. 333/252
6,118,282 A * 9/2000 Grieger ...................... 324/637
6,178,817 B1 * 1/2001 Hewelt et al. ............. 73/290 V
6,202,485 B1 * 3/2001 Wien et al. ................ 73/290 R
6,300,897 B1 * 10/2001 Kielb ........................ 342/124
6,325,391 B1 * 12/2001 Smith et al. ................. 277/650
6,386,055 B1 * 5/2002 Eason ....................... 73/866.5
6,393,909 B1 * 5/2002 Fahrenbach et al. ....... 73/290 V
6,417,748 B1 7/2002 Lopatin et al.
6,499,346 B1 * 12/2002 Wien et al. ................ 73/290 R
6,614,391 B1 * 9/2003 Burger et al. ............... 342/124
6,834,546 B2 * 12/2004 Edvardsson ............... 73/290 V
6,891,513 B2 * 5/2005 Kienzle et al. .............. 343/786
7,009,408 B2 * 3/2006 Maier ......................... 324/644
7,068,213 B2 * 6/2006 Muller et al. ............... 342/124
7,102,584 B2 * 9/2006 Janitch et al. ............... 343/785
7,106,248 B2 * 9/2006 Janitch et al. ............... 342/124
7,134,315 B1 * 11/2006 Stigler et al. .............. 73/290 V
7,204,140 B2 * 4/2007 Kallsand et al. ........... 73/290 R
7,259,712 B1 * 8/2007 McKeen et al. ............. 342/124
2001/0047685 A1 12/2001 Lubbers (Continued)

FOREIGN PATENT DOCUMENTS

DE 102 06 110 A1 8/2003

(Continued)

*Primary Examiner*—Thomas H Tarcza
*Assistant Examiner*—Matthew M Barker

(57) ABSTRACT

A horn antenna suitable for use with a level measurement device and having a composite emitter structure. The emitter structure or assembly comprises an emitter and a plug. The emitter provides the process interface and is formed from a material having properties which include microwave transparency, chemical resistance and/or mechanical strength. The plug is isolated or partitioned from the process interface. The plug is formed from a material different from the emitter and exhibits the properties of microwave transparency and/or mechanical strength. According to another aspect, the level measurement device includes a coupling mechanism which allows the removal of the horn antenna independently of the emitter.

13 Claims, 2 Drawing Sheets

U.S. PATENT DOCUMENTS

| | | | | |
|---|---|---|---|---|
| 2002/0066314 | A1 * | 6/2002 | Lubbers | 73/290 R |
| 2002/0080080 | A1 * | 6/2002 | Kloefer et al. | 343/785 |
| 2003/0025630 | A1 * | 2/2003 | Fehrenbach et al. | 342/124 |
| 2004/0200276 | A1 * | 10/2004 | Lenk | 73/290 R |
| 2005/0017896 | A1 * | 1/2005 | Klofer et al. | 342/124 |
| 2005/0253751 | A1 * | 11/2005 | Feisst et al. | 342/124 |
| 2006/0033673 | A1 * | 2/2006 | Cupples | 343/878 |
| 2006/0055591 | A1 * | 3/2006 | Eriksson | 342/124 |
| 2006/0071848 | A1 * | 4/2006 | Edvardsson | 342/124 |
| 2006/0158371 | A1 * | 7/2006 | Duivenvoorden | 342/124 |
| 2007/0139256 | A1 * | 6/2007 | Edvardsson | 342/124 |

FOREIGN PATENT DOCUMENTS

| | | | |
|---|---|---|---|
| EP | 1 296 405 | A2 | 3/2003 |
| EP | 1 396 710 | A2 | 3/2004 |
| WO | WO 97/12211 | A1 | 4/1997 |

* cited by examiner

HORN ANTENNA WITH A COMPOSITE EMITTER FOR A RADAR-BASED LEVEL MEASUREMENT SYSTEM

CROSS REFERENCE TO RELATED APPLICATIONS

This application claims priority of European application No. 05012669.7 EP filed Jun. 13, 2005, which is incorporated by reference herein in its entirety.

FIELD OF THE INVENTION

The present invention relates radar-based level measurement systems, and more particularly to a horn antenna arrangement having a composite material emitter.

BACKGROUND OF THE INVENTION

Time of flight ranging systems find use in level measurements applications, and are commonly referred to as level measurement systems. Level measurement systems determine the distance to a reflective surface (i.e. reflector) by measuring how long after transmission energy, an echo is received. Such systems may utilize ultrasonic pulses, pulse radar signals, or other microwave energy signals.

Pulse radar and microwave-based level measurement systems are typically preferred in applications where the atmosphere in the container or vessel is subject to large temperature changes, high humidity, dust and other types of conditions which can affect propagation. To provide a sufficient receive response, a high gain antenna is typically used. High gain usually translates into a large antenna size with respect to the wavelength.

Two types of antenna designs are typically found in microwave-based level measurement systems: rod antennas and horn antennas. Rod antennas have a narrow and elongated configuration and are suitable for containers having small opening/flange sizes and sufficient height for accommodating larger rod antennas. Horn antennas, on the other hand, are wider and shorter than rod antennas. Horn antennas are typically used in installations with space limitations, for example, vessels or containers which are shallow.

The level measurement instrument or device comprises a housing and a waveguide (i.e. the antenna). The level measurement instrument is mounted on top of a container or vessel and the antenna extends into the vessel. The level measurement instrument is typically bolted to a flange around the opening of the container. The housing holds the electronic circuitry. The antenna extends into the interior of the vessel and is connected to a coupler which is affixed to the housing. The antenna is electrically coupled to the electronic circuit through a waveguide, for example, a coaxial cable. The waveguide has one port connected to the antenna coupler and another port connected to a bidirectional or input/output port for the electronic circuit. The antenna converts guided waves into free radiated waves, and is reciprocal, i.e. also converts the free radiated waves into guided waves. The antenna is excited by electromagnetic (i.e. radio frequency) pulses or energy received through the waveguide from the circuit and transmits electromagnetic pulses or energy into the vessel. The antenna couples the pulses that are reflected by the surface of the material contained in the vessel and these pulses are converted into guided electromagnetic signals or energy pulses which are guided by the waveguide to the circuit.

In many applications, the material contained in the vessel and being measured is held at high temperatures and/or high pressures. Furthermore, the material itself may comprise highly aggressive (i.e. highly corrosive) chemicals or substances. It will be appreciated that such substances or conditions present a harsh operating environment for the level measurement device and, in particular, the process interface between the antenna and the material.

Accordingly, there remains a need for improvements in a horn antenna configuration and/or emitter structure for radar-based level measurement systems.

BRIEF SUMMARY OF THE INVENTION

The present invention provides a horn antenna arrangement having a composite emitter formed from two materials and suitable for use in microwave-based level measurement devices based on pulsed signals or continuous signals and time of flight ranging systems.

In a first aspect, the present invention provides an antenna structure suitable for use in a level measurement device for measuring the level of a material held in a container, the antenna structure comprises: a horn antenna; an emitter assembly, the emitter assembly is positioned in the horn antenna, and has an emitter and a plug, the emitter has a surface for interfacing with a corresponding surface on the plug, and the plug includes a port for coupling to a waveguide from the level measurement device; and a coupler for coupling the horn antenna to the level measurement device.

In another aspect, the present invention provides a level measurement apparatus for determining a level measurement for material contained in a vessel, the level measurement apparatus comprises: an antenna; a housing; a coupler for coupling the antenna to the housing; a controller having a receiver module and a transmitter module, the controller has a bidirectional port for coupling to a waveguide; the antenna includes an emitter assembly, the emitter assembly is positioned in the antenna, and has an emitter and a plug, the emitter has a surface for interfacing with a corresponding surface on the plug, and the plug includes a port for coupling to the waveguide to the controller.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference is now made to the accompanying drawings which show, by way of example, embodiments of the present invention and in which.

In the drawings, like references or characters indicate like elements or components.

DETAILED DESCRIPTION OF EMBODIMENTS OF THE INVENTION

Figure 1:
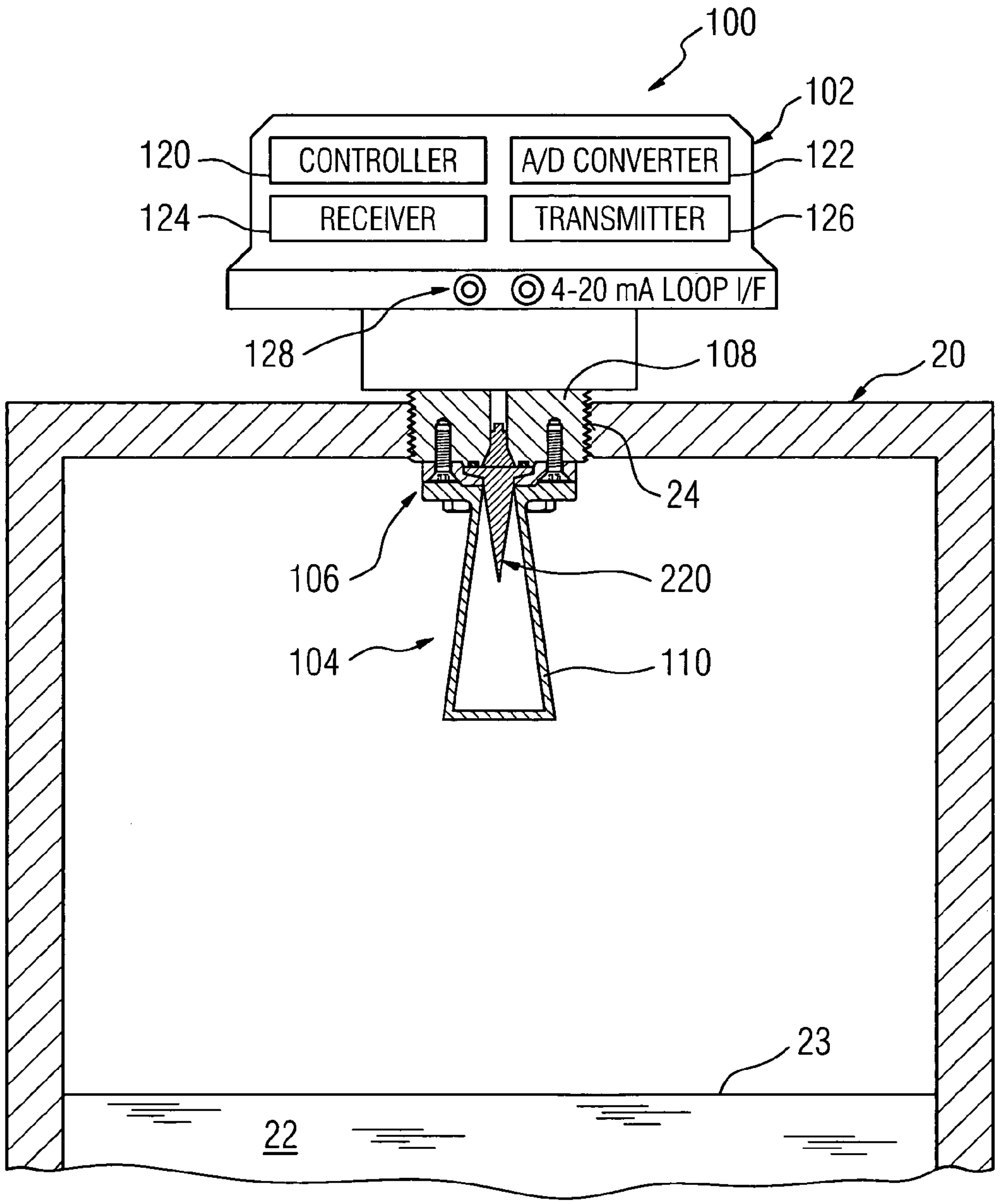
FIG. 1 shows in diagrammatic form a radar-based level measurement system with a horn antenna apparatus according to the present invention.

Reference is first made to FIG. 1 which shows in diagrammatic form a radar-based or a microwave-based level measurement apparatus 100 with a horn antenna having an emitter structure in accordance with the present invention.

As shown in FIG. 1, the level measurement apparatus 100 is mounted on top of a container or vessel 20 which holds a material 22, e.g. liquid, slurry or solid. The level measurement apparatus 100 functions to determine the level of the material 22 held in the vessel 20. The level of the material 20 is defined by a top surface, denoted by reference 23, which provides a reflective surface for reflecting electromagnetic waves or energy pulses. The vessel or container 20 has an opening 24 for mounting the level measurement apparatus 100.

The level measurement apparatus 100 comprises a housing member or enclosure 102, an antenna assembly 104 and a mounting mechanism 106. The housing 100 holds electrical/electronic circuitry as described in more detail below. The antenna assembly 104 extends into the interior of the vessel 20 and comprises an antenna 110 (i.e. waveguide). As will be described in more detail below, the antenna assembly 104 comprises a horn antenna 210 and an emitter structure 220 (FIG. 2) in accordance with the present invention.

The level measurement apparatus 100 has a mounting mechanism 106 which couples the apparatus 100 to the opening 24 on the vessel 20. As will be described in more detail below, the mounting mechanism 106 may comprise a threaded collar 108 which is screwed into a corresponding threaded section in the opening 24 on the vessel 20. It will be appreciated that other attachment or clamping devices, for example, a flanged connector mechanism, may be used to secure the level measurement apparatus 100 to the opening 24 and/or vessel 20 as will be familiar to those skilled in the art. The antenna assembly 104, or the antenna 110, is coupled to the mounting mechanism 106 as described in more detail below and with reference to FIG. 2.

Figure 2:
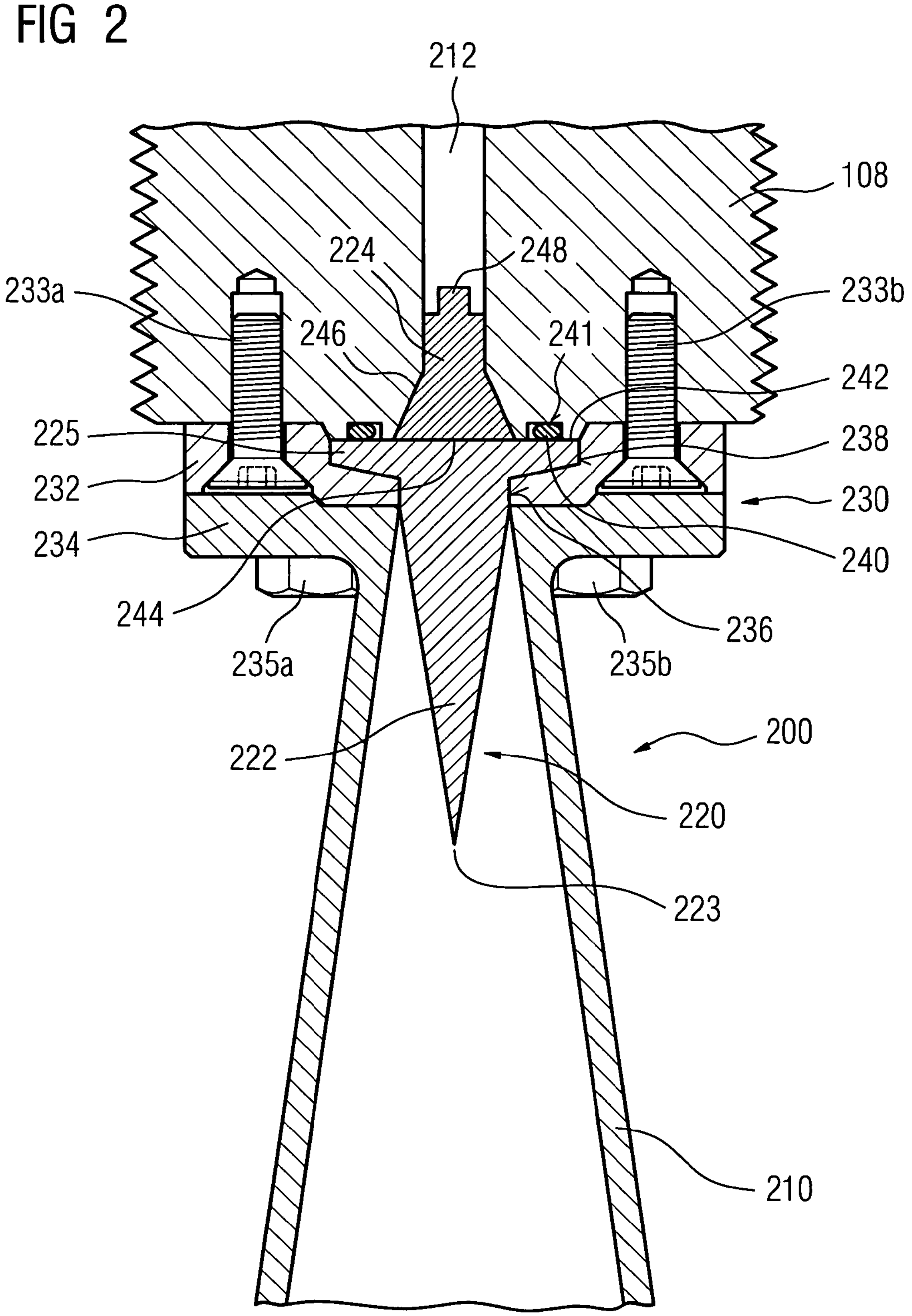
FIG. 2 provides an enlarged view of the horn antenna of FIG. 1 showing the emitter structure in accordance with the present invention.

The level measurement apparatus 100 includes circuitry comprising a controller 120 (for example a microcontroller or microprocessor), an analog-to-digital (A/D) converter 122, a receiver module 124 and a transmitter module 126. The level measurement circuitry 100 may also include a current loop interface (4-20 mA) indicated by reference 128. The antenna 104 is coupled to the controller 120 through the transmitter module 126 and the receiver module 124. The physical connection between the antenna 104 and the transmitter module 126 and the receiver module 124 comprises an emitter structure or assembly 220 (FIG. 2) and a waveguide coupled to a bidirectional (i.e. input/output) port on the level measurement apparatus 100. The emitter assembly 220 is coupled to a bidirectional port on the controller 120 through a coaxial cable or other suitable waveguide 212 (FIG. 2). The controller 120 uses the transmitter module 126 to excite the antenna 104 with electromagnetic energy in the form of radar pulses or continuous radar waves. The electromagnetic energy, i.e. guided radio frequency waves, is transmitted to the antenna 104 through the coaxial cable or waveguide 212 (FIG. 2) coupled to the antenna 104. The antenna 104 converts the guided waves into free radiating waves which are emitted by the antenna 104 and propagate in the vessel 20. The electromagnetic energy, i.e. reflected free radiating waves, reflected by the surface 23 of the material 22 contained in the vessel 20 is coupled by the antenna 104 and converted into guided electromagnetic signals which are transmitted through the waveguide 212 (FIG. 2) back to the receiver module 124. The electromagnetic signals received from the antenna 106 are processed and then sampled and digitized by the A/D converter 122 for further processing by the controller 120. The controller 120 executes an algorithm which identifies and verifies the received signals and calculates the range of the reflective surface 23, i.e. based on the time it takes for the reflected pulse (i.e. wave) to travel from the reflective surface 23 back to the antenna 106. From this calculation, the distance to the surface 23 of the material 22 and thereby the level of the material, e.g. liquid 22 in the vessel 20, is determined. The controller 120 also controls the transmission of data and control signals through the current loop interface 128. The controller 120 is suitably programmed to perform these operations as will be within the understanding of those skilled in the art. These techniques acre described in prior patents of which U.S. Pat. No. 4,831,565 and U.S. Pat. No. 5,267,219 are exemplary.

The antenna assembly 104 may include an appropriate internal metallic structure (not shown) for functioning as a waveguide in conjunction with the transmitter 126 and receiver 124 modules. The antenna assembly 104 transmits electromagnetic signals (i.e. free radiating waves) onto the surface 23 of the material 22 in the vessel 20. The electromagnetic waves are reflected by the surface 23 of the material 22, and an echo signal is received by the antenna assembly 104. The echo signal is processed using known techniques, for example, as described above, to calculate the level of the material 22 in the vessel 20.

Reference is next made to FIG. 2, which shows in more detail the antenna assembly 104 indicated by reference 200. The antenna assembly 200 comprises the horn antenna 210 and the emitter structure or assembly 220 according to the present invention.

The horn antenna 210 comprises a microwave conical horn antenna. The antenna 210 may be made from a chemically inert metal, i.e. corrosion resistant Super Alloys and duplex stainless steel, for example, Hastalloy™. As will be described in more detail below, the horn antenna 210 is field replaceable independently of the emitter assembly 220 according to an aspect of the invention.

As shown, the emitter assembly 220 comprises a lower section or emitter 222 and an upper section or a plug 224. The lower section or emitter 222 is located on the process side and is formed or made from a dielectric material according to this aspect. The emitter 222 is backed by the plug 224 which is formed from a different dielectric material. The emitter 222 has a conical tip 223 and a constant diameter section 225. The conical tip 223 protrudes inside the horn antenna 210. For a typical application or implementation, the conical tip 223 and/or the constant diameter section 225 will have a shape, length and diameter which is optimized for microwave matching of the horn antenna 210 as will be familiar to those skilled in the art. By exhibiting microwave transparency, the emitter 222 does not unnecessarily attenuate the microwave signals, thereby providing higher sensitivity and consequently longer measurement range for the device 100.

As shown in FIG. 2, the antenna assembly 200 includes a coupling mechanism 230 for coupling the horn antenna 210 and/or the emitter structure 220 to the mounting mechanism 106 (FIG. 1), i.e. the threaded collar 108 as depicted. As shown, the coupling mechanism 230 comprises a retainer ring 232 for coupling the emitter structure 220 and a flange 234 for coupling the horn antenna 210. The retainer ring 232 includes an opening 236 and/or recessed seat 238 which is dimensioned to receive the emitter structure 220 (i.e. the lower section or the emitter 222). The retainer ring 232 is connected to the collar 108 using two or more fastening bolts or other suitable fasteners 233, indicated individually by references 233*a*, 233*b*. As shown, an O-ring 240 may be provided between the flat surface 223 of the emitter 222 of the emitter assembly 220 and the collar 108 to form a sealed interface. The O-ring 240 may fit into a groove 241 formed on the surface 223 of the emitter 222 and/or the lower face of the collar 108. The flange 234 couples the horn antenna 210 to the coupling mechanism 230 and the collar 108 and may be formed as part of the horn antenna 210. Two or more bolts or similar fasteners 235, indicated individually by references 235*a*, 235*b*, connect the horn antenna 210. The bolts 235 pass through corresponding openings or holes in the retainer ring 232 and engage respective threaded bores (not shown) in the collar 108. With this arrangement, it is possible to remove the horn antenna 210, for example in the field, without disturbing the emitter assembly 220. The emitter assembly 220 is held in place by the retainer ring 232 and a sealed connection is maintained by the interface of the surface 242 of the emitter 220 and the lower surface of the collar 108 and the O-ring 240.

Referring still to FIG. 2, the upper section or plug 224 has a flat face indicated by reference 244. The flat face 244 is on the process side, i.e. in contact with emitter 222, and at approximately the same level as the steel wall (i.e. cavity) in the collar 108. The diameter of the flat face 244 is smaller than the diameter of the flat surface 242 of the emitter 222 so that there is room to position the O-ring 240. As shown, the plug 224 has a conical section 246 and a tip section 248. The shape of the conical section 246 facilitates the transmission of the effort due to pressure effects to the steel wall of the cavity of the collar 108. It will be appreciated that the conical shape of the section 246 provides a compromise between mechanical strength and microwave matching. The tip section 248 protrudes in the waveguide 212 and is implemented to provide microwave matching. The tip section 248 is depicted with a stepped transition, but may also be implemented with a multiple step tip, a conical shaped tip, or a multiple conical shape, and further matched or tuned for the waveguide.

The emitter structure 220, i.e. the emitter 222 and the plug 224, allow the horn antenna 210 to be configured in the field, e.g. at a customer site or installation, without affecting the internal circuitry of the device 100. For example, the horn antenna 210 may be removed and/or replaced with the emitter assembly 220 remaining in place and attached to the collar 108.

The properties of the emitter 222 include being transparent for microwaves, being insensitive to aggressive chemicals and/or being mechanically strong, for example, to withstand high pressures (e.g. 40 Bars) or high temperatures (e.g. 150° C.). The emitter 222 may be formed from a chemically inert polymeric material, for example, materials from the Tetrafluoroethylene (TFE) family) which are capable of withstanding high temperatures and also exhibit low microwave losses. Such a structure or properties for the emitter 222 allow the device 100 to be used to measure materials at high pressures and/or high temperatures and/or in direct contact with reactive chemicals and their vapours. The plug 224 is formed from a material characterized by high mechanical strength, for example, polymers (PPS, PEEK), ceramics or glasses. The plug 224 material may further be characterized by good thermal properties and low microwave losses, i.e. transparent to microwaves. As compared to the emitter 222, the material for the plug 224 may have a lower resistance to aggressive chemicals because it is protected by the emitter 222 and the O-ring 240.

The O-ring 240 may be formed from a variety of materials having sealing properties. Suitable materials include, for example, PolyTetra Fluoro-Ethylene or PTFE, FKM for example under the trade-name Viton™, or FFKM for example under the trade-name Karlez™. It will be appreciated that the microwave loss characteristic (i.e. transparency) is not as critical for the O-ring 240 as it is for the composite emitter structure 220 (i.e. the emitter 222 and/or the plug 224).

While described in the context of an ultrasonic pulse, radar pulse or microwave based time-of-flight or level measurement application, the apparatus and techniques according to the present invention also find application in a FMCW radar level transmitter system. FMCW radar level transmitter systems transmit a continuous signal during the measurement process. The frequency of the signal increases or decreases linearly with time so that when the signal has travelled to the reflective surface and back, the received signal is at a different frequency to the transmitted signal. The frequency difference is proportional to the time delay and to the rate at which the transmitted frequency was changing. To determine the distance that the reflector is away from the radar transmitter, it is necessary to analyze the relative change of the received signal with respect to the transmitted signal as will be appreciated by those skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather the foregoing description, and all changes which come within the meaning and range of equivalency of the claims are therefore intended to be embraced therein.

What is claimed is:

1. An antenna structure for use in a level measurement device for measuring a level of a material held in a container, comprising:

a horn antenna;

an emitter assembly comprising:

a plug including a port for coupling to a waveguide from the level measurement device, and an emitter having a surface for interfacing with a corresponding surface on the plug; and a coupler for coupling the horn antenna to the level measurement device, wherein the coupler further comprises:

a first mechanism for coupling the horn antenna to the level measurement device, and a second mechanism for coupling the emitter assembly to the level measurement device, wherein the first mechanism is independently operable of the second mechanism, and the first mechanism couples the horn antenna to the level measurement device indirectly via the second mechanism, wherein at least a portion of the emitter assembly is arranged in the horn antenna, wherein the second mechanism comprises a retaining ring having:

a recess for supporting one end of the emitter, and a plurality of fasteners for securing the retaining ring to the level measurement device, wherein the emitter includes a tip section and a constant diameter section, the constant diameter section having a diameter corresponding substantially to the diameter of the recess, and wherein the plug comprises:

a tip section providing a waveguide coupling port, and a conical section having a surface for interfacing with the emitter.

2. The structure as claimed in claim 1, wherein the first mechanism comprises a fastener for connecting the horn antenna to the retaining ring.

3. The structure as claimed in claim 1, wherein the level measurement device includes a mounting collar having an internal chamber having a substantially reciprocal conical recess for receiving the conical section of the plug.

4. The structure as claimed in claim 1, wherein the emitter is formed from a material having a property selected from the group consisting of microwave transparency, chemical resistance, mechanical strength, and combinations thereof.

5. The structure as claimed in claim 4, wherein the material for the emitter comprises a chemically inert polymeric material.

6. The antenna as claimed in claim 5, wherein the plug is formed from a material having a property selected from the group consisting of mechanical strength, microwave transparency, and combinations thereof.

7. The structure as claimed in claim 6, wherein the material for the plug is selected from the group consisting of polymers, ceramics and glass.

8. The structure as claimed in claim 1, wherein the coupler further comprises a barrier member positioned in an annular recessed groove that encompasses an interfacing surface of the plug, said barrier member forming an environmental barrier between an outside environment and the plug.

9. The structure as claimed in claim 8, wherein the barrier member comprising an O-ring formed from a material selected from the group consisting of PTFE, FKM, and FFKM.

10. A level measurement apparatus for determining a distance for material contained in a vessel, the level measurement apparatus comprising:

a housing;

an antenna;

a coupler for coupling the antenna to the housing, the coupler comprising:

a first mechanism for coupling the antenna to the housing, and a second mechanism for coupling the emitter assembly to the housing, wherein the first mechanism is independently operable of the second mechanism, and the first mechanism couples a horn antenna to the level measurement device indirectly via the second mechanism;

a controller having a receiver module and a transmitter module, the controller having a bidirectional port for coupling to a waveguide; and an emitter assembly comprising:

a plug including a port for coupling to the waveguide to the controller, and an emitter having a surface for interfacing with a corresponding surface on the plug, wherein at least a portion of the emitter assembly is positioned in the antenna, wherein the second mechanism comprises a retaining ring, the retaining ring having:

a recess for supporting one end of the emitter, and a plurality of fasteners for securing the retaining ring, wherein the emitter comprises:

a tip section, and a constant diameter section having a diameter corresponding substantially to the diameter of the recess, wherein the plug comprises:

a tip section providing a waveguide coupling port, and a conical section having a surface for interfacing with the emitter.

11. The apparatus as claimed in claim 10, wherein the emitter is formed from a first material having a chemical resistance; and wherein the plug is formed from a second material having a mechanical strength.

12. The apparatus as claimed in claim 10, further comprises:

a mounting collar including an internal chamber having a substantially reciprocal conical recess for receiving the conical section of the plug.

13. The structure as claimed in claim 10, wherein the coupler further comprises a barrier member positioned in an annular recessed groove that encompasses an interfacing surface of the plug, said barrier member forming an environmental barrier between an outside environment and the plug.

* * * * *